April 20, 1937. E. G. BUSSE 2,077,547
BOTTOM ROD SAFETY GUARD
Filed July 11, 1932   3 Sheets-Sheet 1
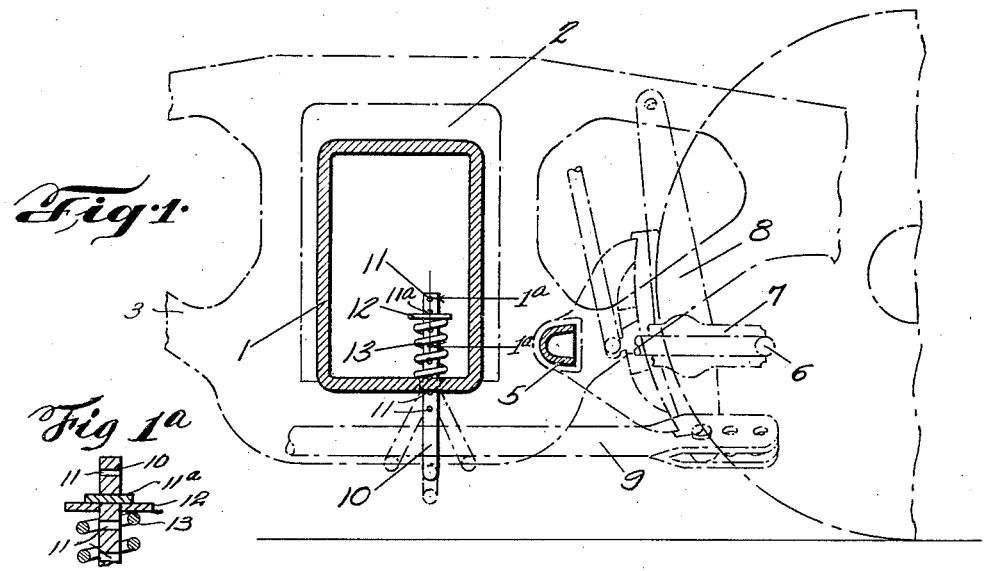
Fig. 1
Fig. 1a
Fig. 2
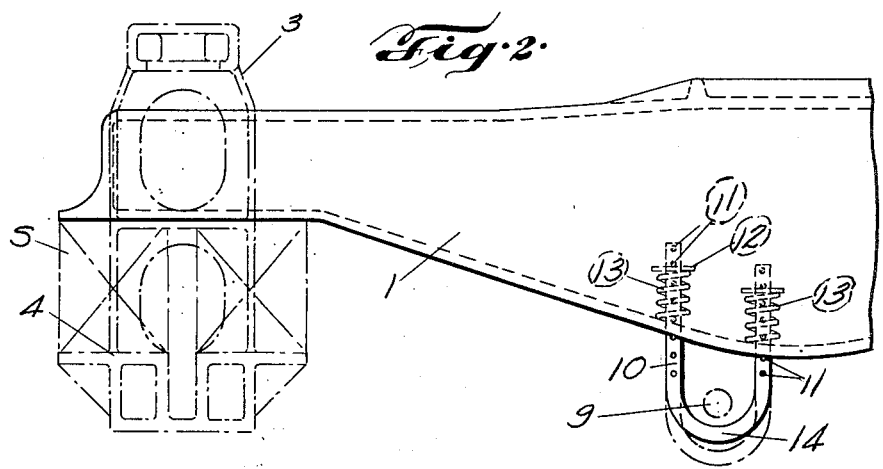
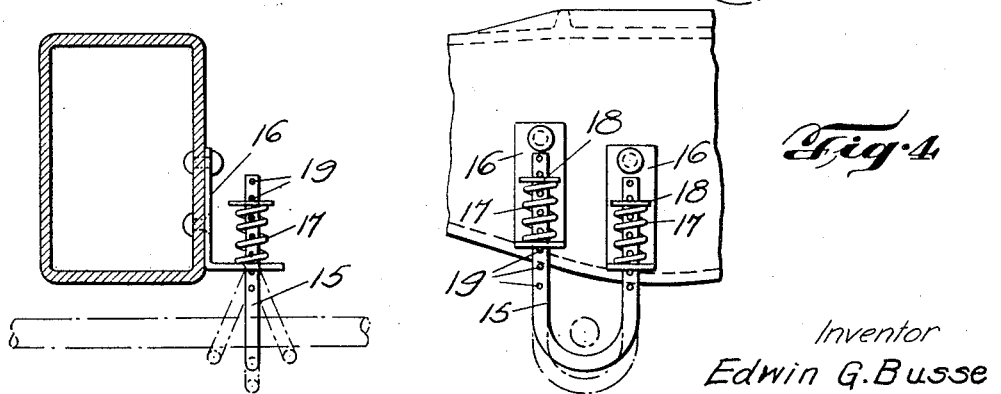
Fig. 3
Fig. 4
Inventor
Edwin G. Busse
By Rodney Bedell
Attorney April 20, 1937.  E. G. BUSSE  2,077,547
BOTTOM ROD SAFETY GUARD
Filed July 11, 1932   3 Sheets-Sheet 2
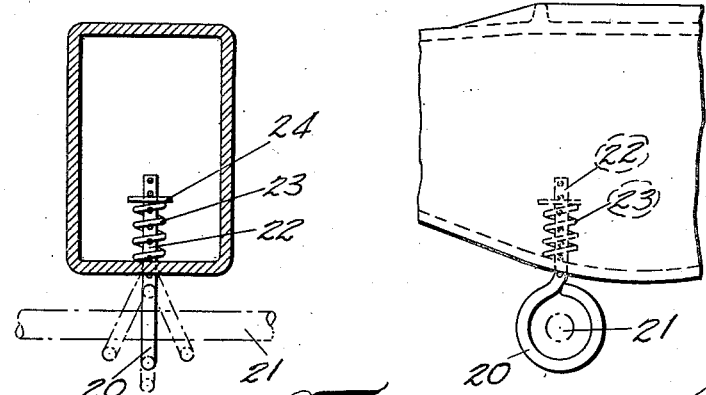
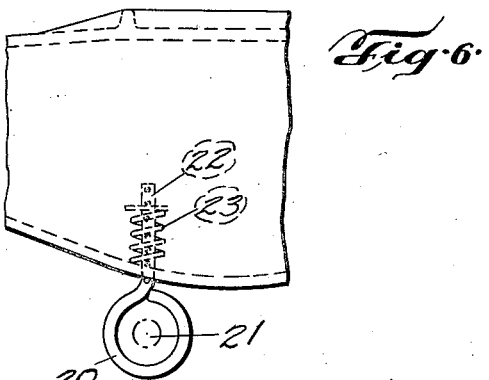
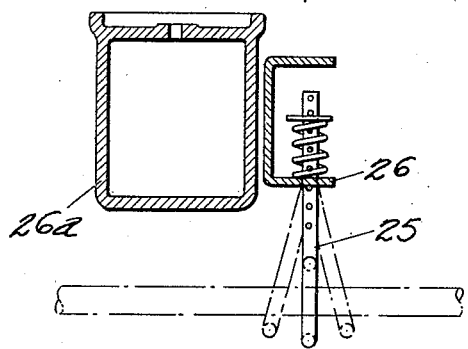
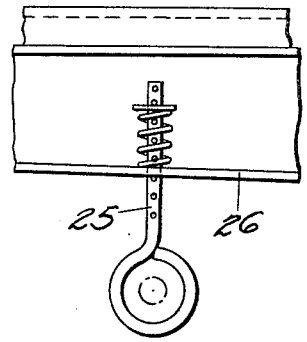
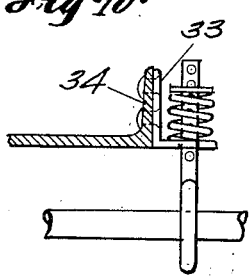
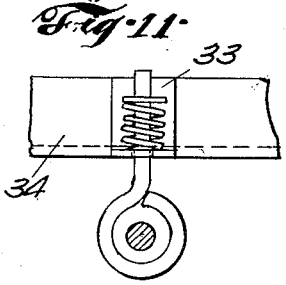
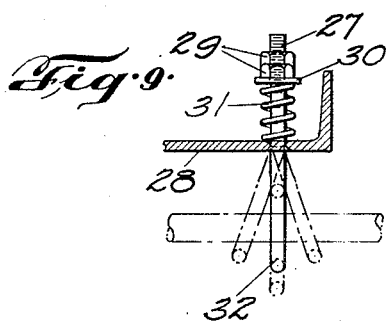
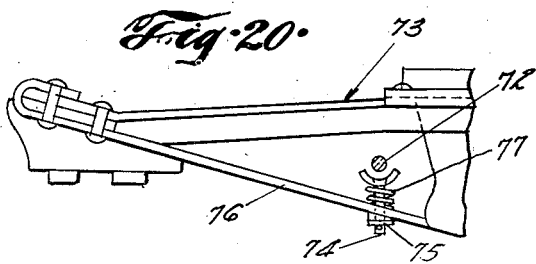
Inventor
Edwin G. Busse
By Rodney Bedell
Attorney April 20, 1937.  E. G. BUSSE  2,077,547
BOTTOM ROD SAFETY GUARD
Filed July 11, 1932  3 Sheets—Sheet 3
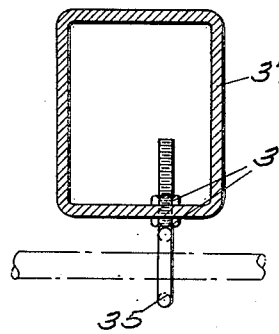
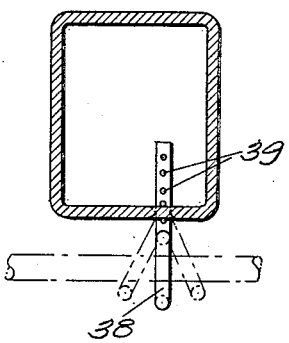
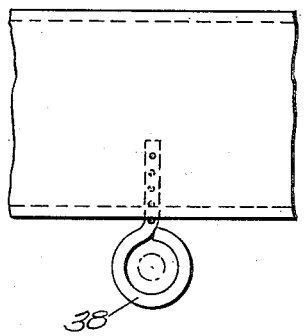
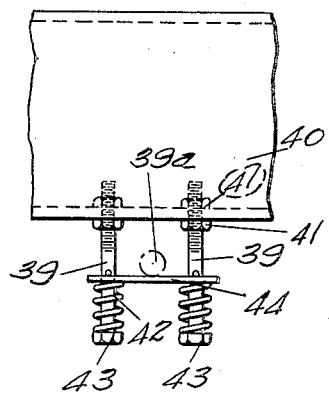
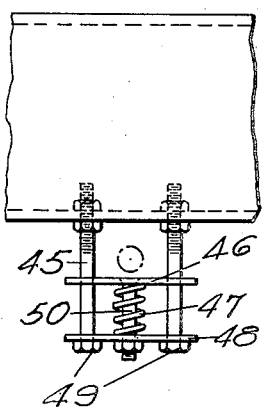
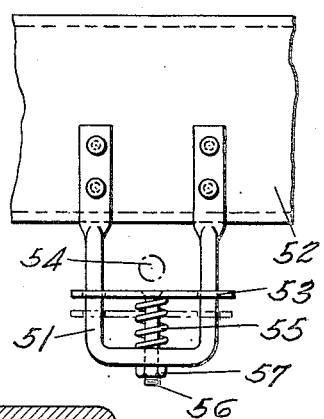
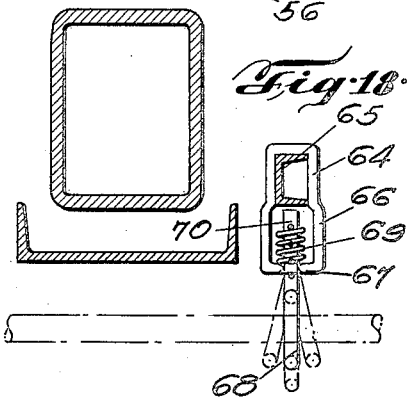
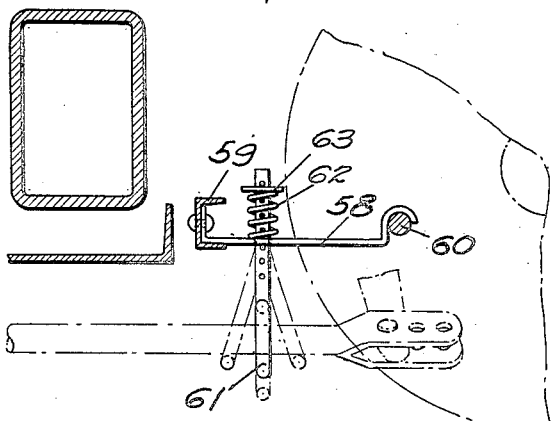
Inventor
Edwin G. Busse
By Rodney Bedell
Attorney Patented Apr. 20, 1937

2,077,547

UNITED STATES PATENT OFFICE 2,077,547

BOTTOM ROD SAFETY GUARD

Edwin G. Busse, Chicago, Ill., assignor to Chicago Railway Equipment Company, Chicago, Ill., a corporation of Illinois Application July 11, 1932, Serial No. 621,767

14 Claims. (Cl. 188—210)

This invention relates to railway rolling stock and consists particularly in a novel safety guard for brake bottom connections. Heretofore, bottom rod safety guards have been rigid with various truck parts such as the spring plank, a transom, or a brake beam. Due to various conditions in a truck, such as wearing of connecting pins on their bearings in the brake lever, brake hanger, or supporting brackets, the bottom connection is permitted to drop, decreasing the distance between the rod and the bearing portion of its safety guard. Where this distance is decreased sufficiently, the safety guard contacts with the rod, restricting or preventing the normal operation thereof and preventing full application of the brakes.

The variation in distance between the brake rod and its safety guard is even more pronounced where the guard is mounted on the bolster, due to settling of the spring and the varying vertical displacement of the bolster due to spring action under different loads. However, in certain trucks, particularly those having no spring plank or transom, it would be advantageous to mount the bottom rod safety guard on the bolster.

One object of the present invention is to provide a bottom rod safety guard carried by a truck bolster.

Another object is to provide a yielding bottom rod guard for accommodating various conditions referred to above.

Another object is to provide means for yieldingly mounting a bottom rod guard upon a bolster, a transom, a brake beam, or other truck part.

Another object is to provide novel means for mounting the bottom connection guard on a truck part which will permit the guard to swing longitudinally to ride over obstructions in the track.

These objects and others are attained by the structures illustrated in the accompanying drawings in which—

Figure 1 is a transverse vertical section through a truck bolster and showing parts of the truck and illustrating one form of the invention.

Figure 1a is an enlarged detail section on line 1a—1a of Figure 1.

Figure 2 is a side view of the bolster in Figure 1.

Figures 3, 5, 7, 9, 10, 12, 13, 18 and 19 are detail sections of truck parts illustrating various forms of the invention.

Figures 4, 6, 8, 11, and 14 are side views of the structures shown in Figures 3, 5, 7, 10, and 13, respectively.

Figures 15, 16, 17 and 20 are side views of a truck part with various other forms of the invention applied thereto.

In Figures 1 to 6, inclusive, the invention is illustrated as applied to a truck bolster vertically movable relative to the frame. In Figures 1 and 2, the bolster 1 extends through the usual opening 2 in the side frame 3 and is supported upon springs S resting upon the spring seat 4. The brake rigging includes a truss-type brake beam having a compression member 5, a tension member 6, and a strut 7, a brake lever 8 pivoted to the strut 7, and a bottom connecting rod 9 pinned to the lower extremity of the lever 8 and passing beneath the bolster 1 to a corresponding brake beam on the other side of the bolster.

A rod safety guard is provided which includes a U-shaped bar member 10 having its legs or shank parts extending through spaced openings or recesses in the lower wall of the bolster. Each leg of member 10 is provided with a series of perforations 11, one of which receives a suitable key or pin 11a for retaining a washer 12 forming a downwardly facing abutting element against which is seated a spring. Coiled about the legs of member 10 are springs 13 which yieldingly maintain the safety guard 10 in position with its lower bearing portion 14 spaced beneath the bottom rod. The tension of springs 13 may be varied by shifting pins 11a to different perforations 11.

The guard receiving recesses in the bolster bottom wall are preferably spaced a substantial distance from the vertical walls of the bolster and loosely receive the legs of the member 10 so that in case of contact with an obstruction in the track the member 10 may tilt to clear the same. Also in case of contact between the rod and its safety guard, the guard may deflect during braking action a sufficient distance to permit normal movement of the bottom rod. The springs 13 are of sufficient strength to withstand the weight of the bottom rod or of the rod and lever 8, in case of loss of a connecting pin, without substantial deflection, but will yield under the application of greater pressures, as mentioned above, where the guard contacts with an obstacle or where the rod moves during braking operation.

In Figures 3 and 4, the legs of the U-shaped safety guard 15 extend through recesses in the bottom flanges of angle brackets 16 secured to the outer face of the bolster. The guards are maintained in position as in the previous form by coiled springs 17 bearing against spring seats 18, the same being manually adjustable by application of the securing key to different openings 19.

In Figures 5 and 6, the safety guard comprises a loop 20 encircling the bottom rod 21 and a single upright bar portion 22 extending through a recess in the bolster bottom wall and provided with a coiled spring 23 and a manually adjustable spring seat 24.

Figures 7 and 8 illustrate a safety guard 25, similar to the guard shown in Figures 5 and 6, applied to the bottom flange 26 of a truck transom at the side of bolster 26a. If desired, the guard could be mounted upon an angle bracket, such as 16 in Figures 3 and 4, which is secured to a vertical wall of the transom.

Figures 9, 10, and 11 illustrate a safety guard applied to a spring plank. In Figure 9 the straight upper portion 27 of the guard is threaded and extends vertically through a recess in the spring plank 28. Threaded portion 27 mounts a pair of nuts 29, one of which seats against the spring seat 30 and the other of which serves as a lock nut. A coiled spring 31 is compressed between the upper surface of the spring plank and the spring seat 30. Obviously, the distance between the looped portion 32 of the guard and the spring plank may be varied by means of the nuts 29.

In Figures 10 and 11, the safety guard is shown applied to an angle bracket 33 riveted to the upright flange 34 of the spring plank. The safety guard illustrated is the same in structure and function as that in Figures 5 to 8.

Figures 12 to 14 illustrate safety guards manually adjustable to accommodate brake rods spaced at varying distances from the truck member upon which the guard is mounted, but in which the yielding connection is eliminated. In Figure 12 the upper portion of the guard 35 is threaded and provided with nuts 36 which seat against the upper and lower surfaces of the bottom wall of box section bolster or transom 37. In Figures 13 and 14 the safety guard 38 is manually adjustable by means of a key insertable in any of the perforations 39 in the upper part of the guard. The upper part of the guard is preferably loosely received in a suitable opening in the bottom wall of the bolster so that the guard may pivot upon the supporting key and tilt to clear obstructions in the track.

Figures 15, 16 and 17 illustrate a bottom rod guard applied to a transom, the guard having a yielding bearing element underlying the rod. In Figure 15, bolts 39 at each side of rod 39a are adjustably secured within recesses in the lower horizontal flange of the transom or other truck part 40 by means of nuts 41. Coiled springs 42 seat against the heads 43 at the lower ends of the bolts 39 and yieldingly support a plate 44 beneath the brake rod and having openings for the bolts 39.

In Figure 16, bolts 45 are secured to the transom, as in Figure 15, but yielding bearing plate 46 is supported upon a single spring 47 seated upon a plate 48 carried by the bolt heads 49. A bolt 50 depends from the bearing plate 46 through spring 47 and an opening in plate 48 and has a nut 50a for varying the tension on spring 47.

In Figure 17, a U-shaped member 51 is riveted to the vertical wall 52 of the transom and the bearing plate 53 is yieldingly carried beneath the rod 54 upon a coiled spring 55 which seats against the bottom bar of the U member. Bolt 56 is provided with a nut 57 at the bottom for varying the tension on spring 55 and the elevation of bearing plate 53.

Figures 18 and 19 illustrate the safety guard applied to a brake beam. Figure 18 illustrates means of applying the safety guard to the compression member only of a truss-type beam or to a solid type beam. The device comprises a bracket having an upper portion 64 encircling the beam 65 and a lower portion 66 having a recess in the horizontal bottom bar 67 thereof which receives the upper portion of the safety guard 68. The guard is yieldingly held in position by a coiled spring 69 and manually adjustable spring seat 70.

In Figure 19, a member 58 extends between the compression member 59 and tension member 60 of the beam and has a recess receiving the upright portion of the guard 61. Coiled spring 62 seats against the manually adjustable spring seat 63 and yieldingly maintains the guard in position, as in Figure 18.

In Figure 20, a connecting rod 72 passing through the bolster 73 is safeguarded by a yielding guard mounted on the lower member 76 of the bolster by means of a bolt 74, washer 75, and coiled spring 77. If desired, a similar member may be provided on top of the bolster for guarding an adjacent top rod.

The total weight carried by the yielding safety guards illustrated, in case of loss of a connection pin between brake lever and strut, or between the lever and bottom rod, is not in excess of 50 pounds and the springs used would be only of sufficient rigidity to suport this weight. It is desirable in the various forms, contemplating tilting of the safety guard to clear obstructions in the track, that the guard be substantially spaced from the vertical walls of the supporting member.

Each of the forms described may be applied to any convenient truck part, the transom, spring plank, bolster, and brake beam being especially referred to. In the forms showing a pin or key and washer arrangement asociated with the shank part of the bottom rod guard, any other suitable laterally projecting abutment may be provided for the spring which may be either manually adjustable or rigid with the guard. Obviously, the structure as illustrated may be otherwise varied within the spirit of the invention and exclusive use of all such variations as come within the scope of the appended claims is contemplated.

What is claimed is:

1. In combination, a railway truck part, and a brake bottom rod safety guard carried thereby, said guard including a vertically yielding element underlying said rod at a point spaced below said rod to permit unobstructed movements of the same normally.

2. In combination, a railway truck part having a recess therein, a brake bottom rod safety guard having a portion for underlying the brake rod and spaced therefrom and an elongated element projecting through said recess, a downwardly facing abutment movable vertically along said element, and a spring between said truck part and said abutment and yieldingly maintaining said guard in position, said movable abutment serving to accommodate various spacing of a brake rod from said truck part.

3. In combination, a railway truck part having a recess therein, a brake bottom rod safety guard having a portion for underlying the brake rod and an elongated element projecting through said recess and loosely fitting therein, and a normally yielding connection between said elongated element and said truck part whereby said portion may swing within said recess to clear obstructions on the track.

4. In combination, a railway truck part, a brake bottom rod, said part and rod being capable of relative vertical displacement during normal operation, and a rod safety guard having a portion underlying said rod and spaced therefrom, said guard being yieldingly secured to said truck part to accommodate said relative displacement of said rod and part and to permit lateral swinging movement of said guard.

5. In combination, a railway truck part including a bottom wall having a perforation therein, a brake bottom connecting rod beneath said wall, a rod safety guard having a portion underlying said rod and a portion projecting through said perforation, an abutment on said latter-mentioned portion, and a coiled spring between said abutment and said truck part and surrounding said second-mentioned portion, said spring permitting said guard to yield vertically to accommodate varying vertical displacement between said rod and said truck part, and there being sufficient space above said wall and around said second-mentioned portion to permit said guard to swing laterally in said perforation.

6. In a railway truck, a frame, a bolster vertically movable relative thereto, a brake bottom connecting rod supported from said frame, and a vertically yielding safety guard for said rod carried by said bolster.

7. In a railway truck, a brake beam member, a brake bottom connecting rod adjacent the same, and a safety guard for said rod attached to said member and constructed and arranged to yield vertically under load from said connecting rod and without affecting its attachment to said member.

8. In combination, a railway brake beam including a longitudinal structural member, and a brake rod safety device including a bracket portion secured to said member, an element for underlying a brake rod and spaced below the same and having a part associated with said bracket, and a connection between said part and said bracket and constructed and arranged to yield vertically under load from said connecting rod and without affecting its attachment to said member.

9. In combination, a railway truck bolster and a vertically and horizontally yielding guard secured thereto for a brake connecting rod.

10. In a railway truck, spaced brake beams, an elongated element extending between and connected to said beams and movable therewith, a bolster movable vertically relative to said element and beams, and a member depending from said bolster and with a vertically yielding part extending beneath and spaced from said elongated element for safeguarding the same without restricting the normal functioning of said rod and said beams.

11. In combination, a railway truck part, a brake beam connecting rod adjacent said part, said rod and said part being subject to relative vertical movement, and a safety guard for said rod comprising rigid structure rigidly secured to said part and projecting therefrom and an element yieldingly carried by said structure and underlying said rod.

12. In combination, a railway truck part having an opening, a brake bottom rod safety guard having a portion for underlying the brake rod and a rigid elongated element projecting through said opening and having lateral play therein whereby said element and portion may tilt from their normal position to permit said portion to clear obstructions on the track, and a yielding connection between said elongated element and said truck part normally holding said portion in desired position below the rod.

13. In a railway truck, a supported brake beam, a brake beam connecting rod adjacent said beam, and a rod safety guard device carried by said beam and extending beneath and spaced from said rod and constructed and arranged to yield vertically under load from said connecting rod and without affecting its attachment to said beam.

14. In combination, a railway truck part having a recess, a brake bottom rod safety guard having a portion for underlying a brake rod with substantial clearance between them and having an elongated portion slidable lengthwise through said recess and provided with a lateral projection limiting its movement through said recess, and a spring between said truck part and said projection for yieldingly maintaining said guard in position.

EDWIN G. BUSSE.